(12) United States Patent
Barwicz et al.

(10) Patent No.: US 8,942,519 B2
(45) Date of Patent: Jan. 27, 2015

(54) MATERIAL STRUCTURES FOR FRONT-END OF THE LINE INTEGRATION OF OPTICAL POLARIZATION SPLITTERS AND ROTATORS

(71) Applicant: International Business Machines Corporation, Armonk, NY (US)

(72) Inventors: Tymon Barwicz, Yorktown Heights, NY (US); Douglas M. Gill, South Orange, NJ (US); William M. Green, Astoria, NY (US); Marwan H. Khater, Astoria, NY (US); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/971,390

(22) Filed: Aug. 20, 2013

(65) Prior Publication Data

US 2014/0270622 A1 Sep. 18, 2014

Related U.S. Application Data

(63) Continuation of application No. 13/835,725, filed on Mar. 15, 2013.

(51) Int. Cl.
  *G02B 6/00* (2006.01)
  *G02B 6/12* (2006.01)
  *G02B 6/126* (2006.01)

(52) U.S. Cl.
  CPC ..................... *G02B 6/126* (2013.01)
  USPC ............................. 385/11; 385/14

(58) Field of Classification Search
  CPC ............ G02B 6/42; G02B 6/43; G02B 6/105; G02B 6/126; G02B 6/274; G02B 6/2746; G02B 6/4214; G02B 6/12004; G02B 6/12007; H04B 10/2569
  USPC ..................................... 385/11, 14
  See application file for complete search history.

(56) References Cited

U.S. PATENT DOCUMENTS 5,343,544 A  8/1994  Boyd et al.
5,375,184 A  12/1994  Sullivan
(Continued)

FOREIGN PATENT DOCUMENTS

CN   101702048 A   5/2010
CN   102084277 A   6/2011
(Continued)

OTHER PUBLICATIONS

A. Kumar et al., "Birefringence of optical fiber pressed into a V groove," Optics Letters, Dec. 1981, vol. 6, Issue 12, 1981, pp. 644-646.
(Continued)

*Primary Examiner* — Jerry Blevins
(74) *Attorney, Agent, or Firm* — Cantor Colburn LLP; Vazken Alexanian

(57) ABSTRACT

A polarization splitter and rotator of a wafer chip, an optoelectronic device and method of use is disclosed. The first waveguide of the wafer chip is configured to receive an optical signal from an optical device and propagate a transverse electric eigenstate of the received optical signal. The second waveguide is configured to receive a transverse magnetic eigenstate of the received optical signal from the first waveguide. The second waveguide includes a splitter end, a middle section and a rotator end, wherein the splitter end includes a layer of polycrystalline silicon, a layer of silicon oxide and a layer of silicon nitride, the rotated end includes a layer single crystal silicon, a layer silicon oxide and a layer of silicon nitride, and the middle section includes layers of single crystal silicon, silicon oxide polycrystalline silicon and silicon nitride.

4 Claims, 7 Drawing Sheets

(56) References Cited

U.S. PATENT DOCUMENTS

| | | | |
|---|---|---|---|
| 5,499,312 | A | 3/1996 | Hahn et al. |
| 5,625,730 | A | 4/1997 | Ishikawa et al. |
| 6,097,871 | A | 8/2000 | De Dobbelaere et al. |
| 6,157,759 | A | 12/2000 | Seo et al. |
| 6,415,082 | B1 | 7/2002 | Wach |
| 6,470,117 | B1 | 10/2002 | Tang et al. |
| 6,631,228 | B2 | 10/2003 | Gao et al. |
| 6,709,607 | B2 | 3/2004 | Hibbs-Brenner et al. |
| 6,741,776 | B2 | 5/2004 | Iwashita et al. |
| 6,780,944 | B1 | 8/2004 | Miura et al. |
| 6,860,642 | B2 | 3/2005 | Vodrahalli et al. |
| 6,976,792 | B1 | 12/2005 | Cohen et al. |
| 7,058,275 | B2 | 6/2006 | Sezerman et al. |
| 7,197,224 | B2 | 3/2007 | Rolston et al. |
| 7,223,025 | B2 | 5/2007 | Benzoni et al. |
| 7,292,756 | B2 | 11/2007 | Moynihan et al. |
| 7,454,098 | B1 | 11/2008 | Lamprecht et al. |
| 7,477,813 | B2 | 1/2009 | Monma et al. |
| 7,492,995 | B2 | 2/2009 | Kuroda et al. |
| 7,616,852 | B2 | 11/2009 | Ohtsu et al. |
| 7,729,581 | B2 | 6/2010 | Rolston et al. |
| 7,738,753 | B2 | 6/2010 | Assefa et al. |
| 7,779,158 | B2 | 8/2010 | Ohhira |
| 7,794,158 | B2 | 9/2010 | Yasuda et al. |
| 8,320,721 | B2 | 11/2012 | Cevini et al. |
| 8,534,927 | B1 | 9/2013 | Barwicz et al. |
| 8,545,108 | B1 | 10/2013 | Barwicz et al. |
| 8,724,937 | B2 | 5/2014 | Barwicz et al. |
| 2002/0106165 | A1 | 8/2002 | Arsenault et al. |
| 2002/0181877 | A1 | 12/2002 | Van Eck |
| 2002/0181882 | A1 | 12/2002 | Hibbs-Brenner et al. |
| 2003/0007754 | A1 | 1/2003 | Terashima |
| 2004/0022487 | A1 | 2/2004 | Nagasaka et al. |
| 2004/0028314 | A1 | 2/2004 | Lee et al. |
| 2005/0163416 | A1 | 7/2005 | Yamada et al. |
| 2005/0238290 | A1 | 10/2005 | Choudhury et al. |
| 2008/0075408 | A1 | 3/2008 | Cho et al. |
| 2008/0253423 | A1 | 10/2008 | Kopp |
| 2008/0267557 | A1* | 10/2008 | Wang et al. ............... 385/16 |
| 2009/0110354 | A1 | 4/2009 | Sutherland |
| 2009/0226130 | A1 | 9/2009 | Doany et al. |
| 2010/0061683 | A1 | 3/2010 | Sasaki |
| 2010/0310214 | A1 | 12/2010 | Miyadera et al. |
| 2012/0020621 | A1 | 1/2012 | Zhou |
| 2012/0089180 | A1 | 4/2012 | Fathi et al. |
| 2012/0207426 | A1 | 8/2012 | Doany et al. |
| 2012/0275748 | A1 | 11/2012 | Yamaguchi et al. |
| 2013/0156365 | A1 | 6/2013 | Barwicz et al. |
| 2014/0177222 | A1 | 6/2014 | Barwicz et al. |
| 2014/0179034 | A1 | 6/2014 | Barwicz et al. |

FOREIGN PATENT DOCUMENTS

| | | | |
|---|---|---|---|
| JP | 5063419 | A | 3/1993 |
| JP | 2005189730 | A | 7/2005 |
| JP | 2007333982 | A | 12/2007 |
| JP | 2012137538 | A | 7/2012 |
| KR | 2020090001169 | U | 2/2009 |

OTHER PUBLICATIONS

Barwicz, et al., "Polarization-Transparent Microphotonic Devices in the Strong Confinement Limit," Nature Photonics; vol. 1; Jan. 2007; pp. 57-60.

B. G. Lee et al., "20-um-pitch eight-channel monolithic fiber array coupling 160 Gb/s/channel to silicon nanophotonic chip," 2010 Conference on Optical Fiber Communication (OFC), collocated National Fiber Optic Engineers Conference, (OFC/NFOEC), Mar. 21-25, 2010, paper PDPA4, 3 pages.

Barwicz, et al., "Fiber to Wafer Interface," U.S. Appl. No. 13/331,164, filed Dec. 12, 2011; not yet published.

Barwicz et al. "Flexible Fiber to Wafer Itnerface," U.S. Appl. No. 13/428,277, filed Mar. 23, 2012, not yet published.

Booth et al., "Polyguide(tm) Polymeric Technology for Optical Interconnect Circuits and Components," Proc. SPIE, vol. 3005, 1997, pp. 238-251.

OZ Optics, "V-Groove Assemblies," Datasheet DTS0083, Mar. 19, 2009, http://www.ozoptics.com/ALLNEW_PDF/DTS0083.pdf, downloaded Aug. 3, 2011.

Thacker et al., "Flip-Chip Integrated Silicon Photonic Bridge Chips for Sub-Picojoule Per Bit Optical Links", Proceedings 60th Electronic Compoennts and Technology Conference (ECTC), Jun. 1-4, 2010, pp. 240-243.

Wang et al., "Ge-photodetectors for Si-Based Optelectronic Integration", Sensors, vol. 11, No. 1, 2011, pp. 696-718.

Tymon Barwicz, et al., "Material Structures for Front-End of the Line Integration of Optical Polarization Splitters and Rotators," Related U.S. Appl. No. 13/835,725, filed Mar. 15, 2013, pp. 1-27.

Tymon Barwicz, et al., "Fiber Pigtail With Integrated Lid," Related U.S. Appl. No. 13/804,269, filed Mar. 14, 2013, pp. 1-29.

Tymon Barwicz, et al., "Fiber Optic Interface With Adhesive Fill System," Related U.S. Appl. No. 14/327,117, filed Jul. 9, 2014, pp. 1-28.

Tymon Barwicz, et al., "Dual-Polymer Fiber Optic Interface With Melt-Bond Adhesive," Related U.S. Appl. No. 14/327,140, filed Jul. 9, 2014, pp. 1-29.

* cited by examiner

MATERIAL STRUCTURES FOR FRONT-END OF THE LINE INTEGRATION OF OPTICAL POLARIZATION SPLITTERS AND ROTATORS

CROSS REFERENCE TO RELATED APPLICATIONS

The present application is a continuation of U.S. patent application Ser. No. 13/835,725, entitled "MATERIAL STRUCTURES FOR FRONT-END OF THE LINE INTEGRATION OF OPTICAL POLARIZATION SPLITTERS AND ROTATORS", filed on Mar. 15, 2013, which is incorporated herein by reference in its entirety.

BACKGROUND

The present invention relates to semiconductor optoelectronics, and more specifically to integration of photonic devices in the front-end of the line stack (FEOL) of a complementary metal-oxide semiconductor (CMOS) structure of a wafer chip.

Photonic structures can be fabricated on wafer chips in order to create wafers that operate both in an electronic domain and an optical domain. When an optical fiber is used to input light into a waveguide on a wafer chip, care must be taken to properly manage the polarization of light. The orientation of the polarization state in an optical fiber changes randomly with time. The performance of photonic devices on wafer chips is very sensitive to the orientation of the polarization state. Hence, the input polarization state must be processed on the wafer chip for it to be re-oriented into the polarization state for which the photonic devices work the best. To achieve such polarization re-orientation, a polarization splitter and rotator (PSR) is used.

Generally, wafer manufacturing includes a front-end of the line (FEOL) process during which devices are built into bottom layers of a CMOS stack of the wafer chip and a back end of line (BEOL) process for building top layers of the wafer chip that include wiring that interconnects the devices formed during the FEOL process. The bottom FEOL layers include transistors of the wafer chip and its various components (i.e., source, drain, gate, gate dielectric) but do not include metal connectors to the top gate, source and/or drain of the transistors. Devices of a standard CMOS stack may be integrated to various optical devices with electrical input via elements formed at the top layers during a BEOL process. There is currently no method for implementing photonic integration of PSRs at the bottom FEOL layers of a CMOS stack.

SUMMARY

According to one embodiment of the present invention, a polarization splitter and rotator of a wafer chip includes: a first waveguide of the wafer chip configured to receive an optical signal from an optical device; and a second waveguide configured to receive a transverse magnetic eigenstate of the received optical signal from the first waveguide, the second waveguide including a splitter end, a middle section and a rotator end, wherein the splitter end includes a layer of polycrystalline silicon, a layer of silicon oxide and a layer of silicon nitride, the rotated end includes a layer single crystal silicon, a layer silicon oxide and a layer of silicon nitride, and the middle section includes layers of single crystal silicon, silicon oxide polycrystalline silicon and silicon nitride.

According to another embodiment of the present invention, an opto-electronic device of a wafer chip includes: a first waveguide of a wafer chip configured to receive an optical signal from the optical device; and a second waveguide configured to receive a transverse magnetic eigenstate of the received optical signal from the first waveguide, the second waveguide including a splitter end, a middle section and a rotator end, wherein the splitter end includes a layer of polycrystalline silicon, a layer of silicon oxide and a layer of silicon nitride, the rotated end includes a layer single crystal silicon, a layer silicon oxide and a layer of silicon nitride, and the middle section includes layers of single crystal silicon, silicon oxide polycrystalline silicon and silicon nitride.

According to another embodiment of the present invention, a method of managing a polarization of an optical signal on a wafer chip includes: providing a first waveguide and a second waveguide in a front-end of the line layer of the wafer chip, wherein a splitter end of the second waveguide includes a splitter end, a middle section and a rotator end, wherein the splitter end includes a layer of polycrystalline silicon, a layer of silicon oxide and a layer of silicon nitride, the rotated end includes a layer single crystal silicon, a layer silicon oxide and a layer of silicon nitride, and the middle section includes layers of single crystal silicon, silicon oxide polycrystalline silicon and silicon nitride; receiving the optical signal at an input end of the first waveguide; propagating a transverse electric eigenstate of the received optical signal in the first waveguide; and propagating a transverse magnetic eigenstate in the second waveguide via the plurality of layers to manage the polarization of the transverse magnetic eigenstate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
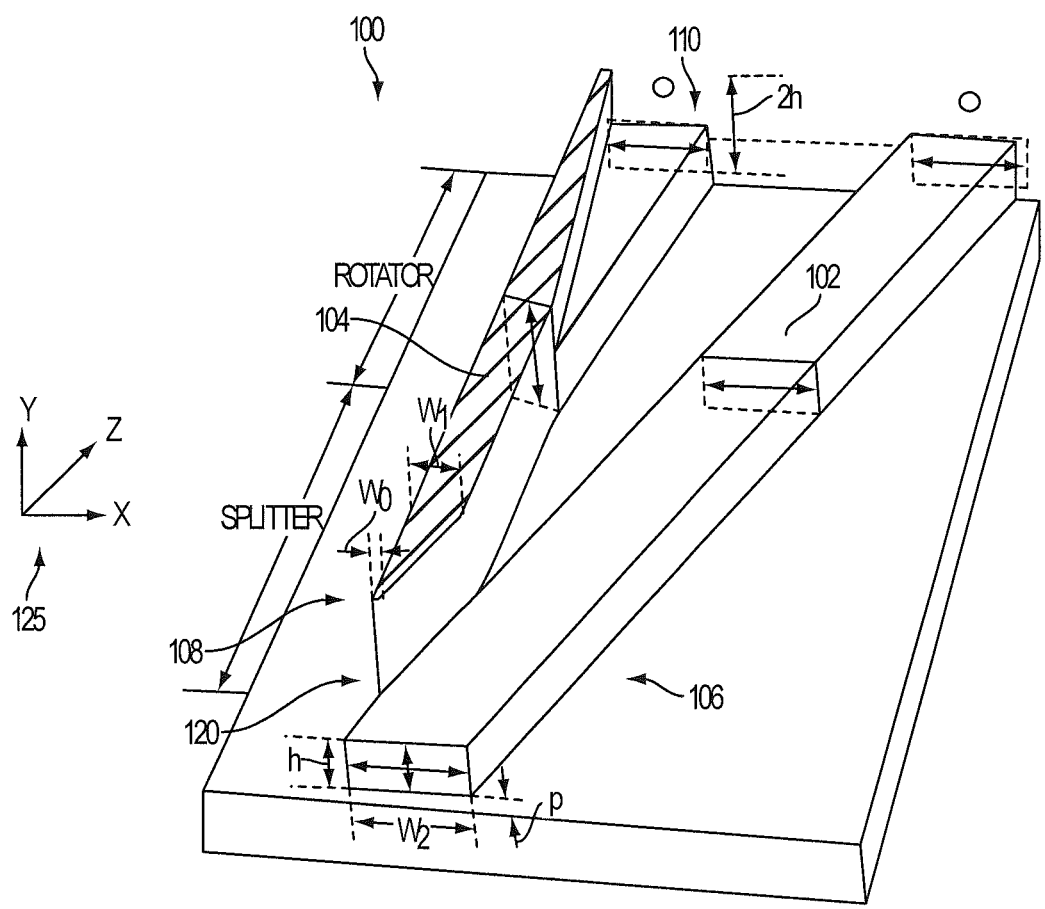
FIG. 1 (Prior Art) shows a known wafer chip design having a mode evolution based photonic polarization splitter and rotator.

FIG. 1 (Prior Art) shows a known mode evolution based wafer chip design 100 having a photonic polarization splitter and rotator (PSR). The PSR includes a first waveguide 102 and a second waveguide 104 formed on the wafer chip 100. The PSR may have an optical splitter section at a forward end and a rotator section at a rear end. The optical splitter section includes a forward end 106 of a first waveguide 102 and a forward end 108 of a second waveguide 104. The forward end 106 of the first waveguide 102 may be separated from the forward end 108 of the second waveguide 104 by a gap 120. A coordinate system 125 is shown for descriptive purposes. The first waveguide 102 includes a substantially rectangular cross-section along the length of the first waveguide 102. The longer edges of the first waveguide 102 are parallel to the surface of the wafer 100 in order to propagate a transverse electric (TE) eigenstate of light. A cross section of the second waveguide 104 at the splitter end is substantially rectangular with the longer edges of the second waveguide perpendicular to the surface of the wafer 100 in order to propagate a transverse magnetic (TM) eigenstate of light. In the wafer chip design 100, the first waveguide 102 and the second waveguide 104 are made of a single material, for example, silicon nitride.

As the light propagates in the second waveguide 104, the cross-section of the second waveguide 104 gradually changes from a vertically-oriented rectangle at splitter cross-section 130 for propagating the TM eigenstate to a horizontally-oriented rectangle at rotator cross-section 140 for propagating a TE eigenstate. This is done by gradually reducing the height (y-dimension) and increasing the width (x-dimension) of the second waveguide 104 as viewed while traversing the z-direction from forward section 108 to rear section 110. Once the TM polarization eigenstate has been rotated to a TE polarization eigenstate, various operations may then be performed on the TE eigenstates in the first waveguide 102 and second waveguide 104.

Figure 2:
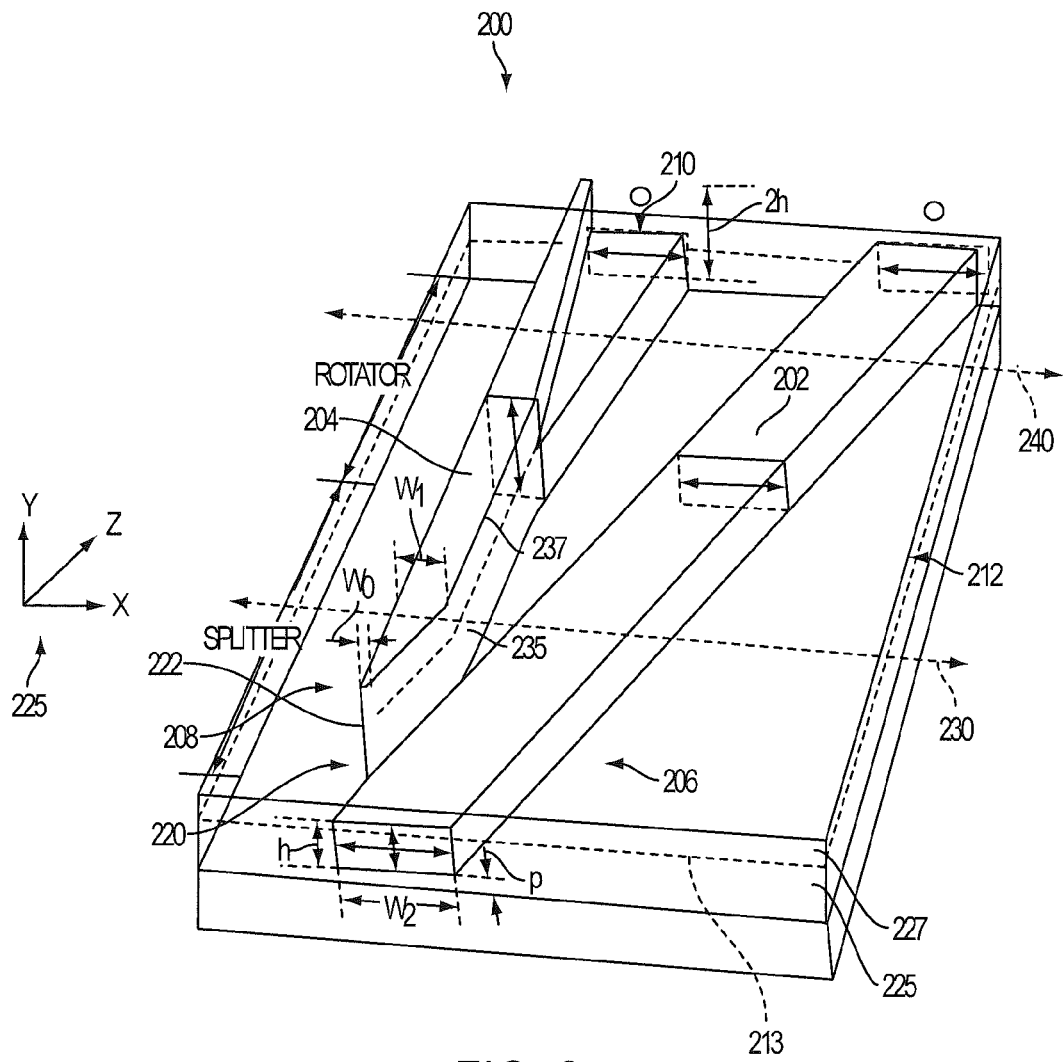
FIG. 2 shows a wafer chip having an exemplary photonic integration device formed in a complementary metal oxide silicon (CMOS) layer of the wafer chip.

FIG. 2 shows a wafer chip 200 of the present invention having an exemplary photonic polarization splitter and rotator (PSR). The PSR includes a first waveguide 202 and a second waveguide 204 formed in the wafer chip 200. The PSR may have an optical splitter section at a forward end and a rotator section at a rear end. The optical splitter section includes a forward end 206 of a first waveguide 202 and a forward end 208 of a second waveguide 204. The forward end 206 of the first waveguide 202 may be separated from the forward end 208 of the second waveguide 204 by a gap 220. A coordinate system 225 is shown for descriptive purposes. A splitter cross-section plane 230 is shown normal to the z-axis intersecting the forward end 206 and forward end 208. The splitter cross-section of the forward end 206 has a substantially rectangular contour. The width (i.e., x-dimension) of the forward end 206 at the splitter cross-section 230 is greater than the height (i.e., y-dimension) of the forward end 206 at the splitter cross-section 230. For the forward end 208 of the second waveguide 204, the height is greater than the width. The rotator section occurs at a rear end 210 of the second waveguide 204. The cross-section of the rear end of the first waveguide 202 is substantially the same as the cross-section of the forward end 206 of the first waveguide 202. A rotator cross-section 240 is shown normal to the z-axis at the rear end 210 of the second waveguide 204. The width of the second waveguide 204 at the rotator cross-section 240 is greater than its height at the rotator cross-section 240, similar to the geometry of the first waveguide 202 at its forward end 206 cross-section.

In a typical PSR, light is received at the forward end 206 of the first waveguide 202 having an arbitrary or randomly oriented polarization. The randomly oriented polarization is characterized by a randomly varying relation between polarization vectors or polarization eigenstates of the light. Polarization eigenstates may be defined along the orientations of the waveguides 202 and 204 in the splitter section. For example, a first of the polarization eigenstates is referred to as a transverse electric eigenstate (TE eigenstate) and has an electric field that is mainly oriented along the horizontal direction (i.e., x-direction). A second of the polarization eigenstates is referred to herein as a transverse magnetic eigenstate (TM eigenstate) and has an electric field that is mainly oriented along a vertical direction (i.e., y-direction). It is appreciated that a PSR is a bi-directional device. It can work as a splitter and rotator when input is provided on one end or as a reversed rotator and combiner if input is provided on the other end. For the illustrative purposes. The PSR is discussed as having the functionality of polarization splitting and then rotating assuming that input is provided on the splitter end. However, in alternate embodiments, the PSR may be used to reverse photonic functionality if the input is provided on the rotator end.

Light or an optical signal enters the light splitter section, generally, via a fiber optic, at the forward end 206 of the first waveguide 202 traveling substantially in the z-direction. The orientation of the forward end 206 of the first waveguide 202 is sympathetic to propagation of the TE eigenstate of the received optical signal. Similarly, the orientation of the forward end 208 of the second waveguide 204 is sympathetic to propagation of the TM eigenstate. Thus, the TE eigenstate of the optical signal is confined within the first waveguide 202 while the TM eigenstate is transferred across gap 220 between the first waveguide 202 and the second waveguide 204 to propagate within the second waveguide 204. The TE and TM eigenstates then propagate along the axes of their respective waveguides 202 and 204. Traveling along the z-direction in the splitter region, the forward section 208 of second waveguide 204 gradually increases from a width $w_0$ to a selected width $w_1$. In general, the gap is of a selected width for providing transfer of the TM eigenstate from the first waveguide 202 to the second waveguide at at least one position along the waveguides. Therefore, in one embodiment, the gap between the two waveguides may be of no more than 1000 nm at at least one position along the two waveguides 202 and 204. The gap 220 may also be larger at the tip 222 of forward section 208 to avoid reflections and then be reduced to accelerate the transfer of the TM eigenstate across it. The gap 220 is increased along the z-direction once the polarization eigenstates have been split into their respective waveguides. Increasing the gap along the z-direction avoids cross-talk between waveguide 202 and 204 in the rotator region.

As the light propagates in the second waveguide 204, the cross-section of the second waveguide 204 gradually changes from a vertically-oriented rectangle at splitter cross-section 230 for propagating the TM eigenstate to a horizontally-oriented rectangle at rotator cross-section 240 for propagating a TE eigenstate. This is done by gradually reducing the height (y-dimension) and increasing the width (x-dimension) of the second waveguide 204 as viewed while traversing the z-direction from forward section 208 to rear section 210. Once the TM polarization eigenstate has been rotated to a TE polarization eigenstate, various operations may then be performed on the TE eigenstates in the first waveguide 202 and the second waveguide 204.

The PSR of FIG. 2 is integrated into complementary metal-oxide semiconductor (CMOS) structures such as transistors and other electronic devices in order to improve performance of silicon photonic devices. In an exemplary embodiment, the first and second waveguides 202, 204 may be fabricated into the complementary metal-oxide semiconductor (CMOS)

layer 212 of the wafer chip 200 during a front end of the line (FEOL) process. As opposed to the PSR of FIG. 1, the CMOS layer 212 in FIG. 2 may include a bilayer of different materials as indicated by dashed line 213 which separates bilayers 225 and 227 of the CMOS layer 212. In alternate embodiments, the CMOS layer 212 may include multiple layers made of multiple different materials. Since the CMOS layer 212 is a bilayer, at least one of the first waveguide 202 and the second waveguide 204 is made of more than one layer of material, as indicated by layers 235 and 237 of the second waveguide 204. Additionally, the material used in either of the first and second waveguides 202, 204 may serve a purpose for operation of other devices within the CMOS layer 212. Thus, either of the first waveguide 202 and the second waveguide 204 may be used as part of a CMOS layer device, such as a part of a transistor, a transistor gate, etc. The first waveguide 202 and second waveguide 204 may be formed using material already present in the CMOS layer as part of an integrated FEOL procedure. Various embodiments of the PSR within the FEOL CMOS layers are discussed below with respect to FIG. 3-7. In FIGS. 3-7, the variation of the waveguides along the z-axis, i.e., variation in widths and the gap 220, is considered to be consistent with the z-variation shown in FIG. 2.

Figure 3:
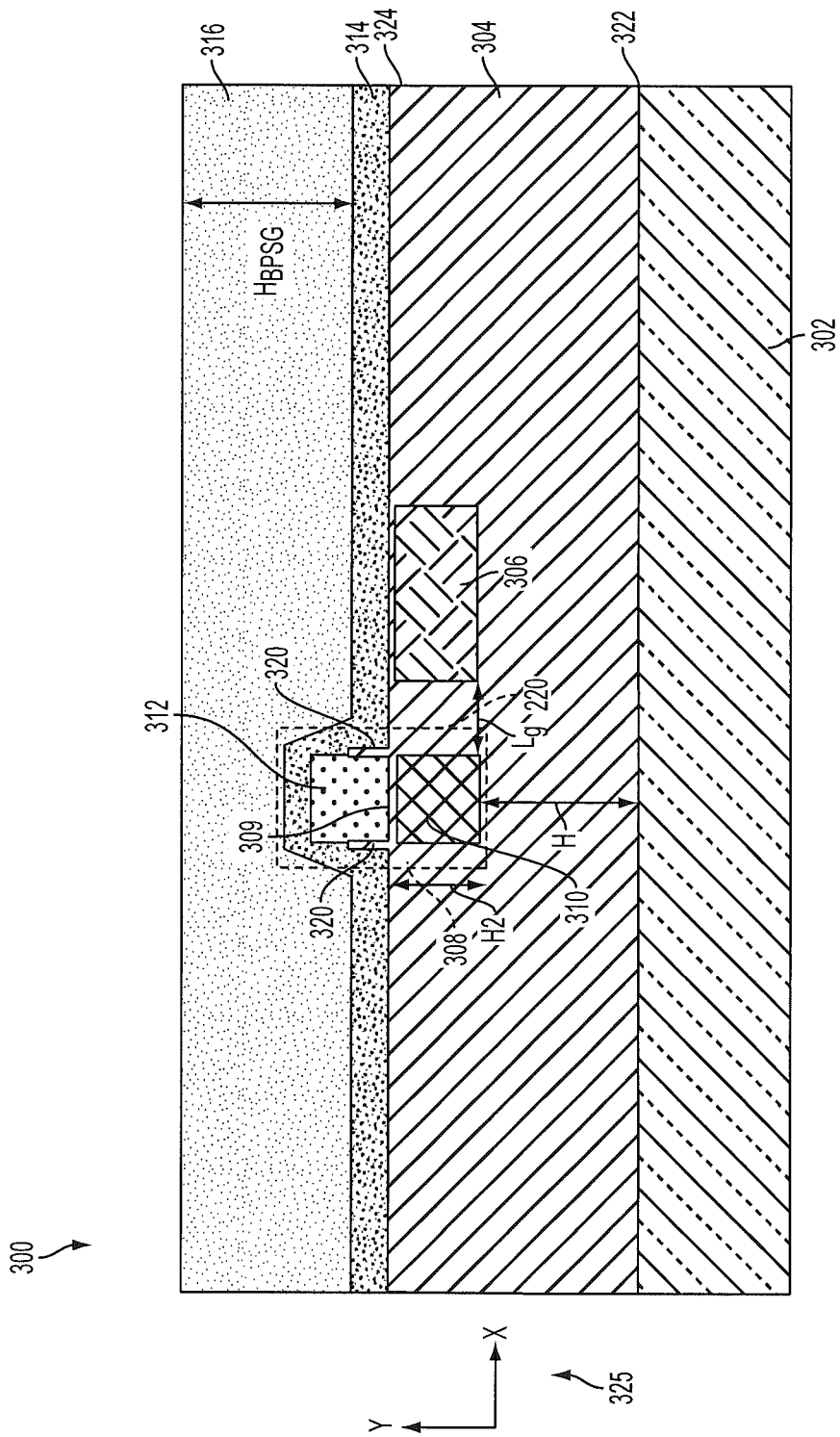
FIG. 3 shows a splitter cross-section of the CMOS layer of the wafer chip of FIG. 2 having a first waveguide and a second waveguide formed therein.

FIG. 3 shows a splitter cross-sectional view 300 of the CMOS layer 200 of FIG. 2 in an exemplary embodiment. The cross-sectional view 300 is seen along the z-axis as indicated by coordinate system 325 and corresponds to the PSR stage defined by splitter cross-section 230. The wafer includes an oxide layer 304 formed on a silicon layer 302 to form an interface 322. In various embodiments, the oxide layer 304 may include silicon oxide that may be created by thermal oxidation, low-pressure chemical vapor deposition, rapid thermal chemical vapor deposition, sputtering or plasma-enhanced chemical vapor deposition, or other suitable technique. A nitride layer 314 may be formed on top of the oxide layer 304 to thereby form a nitride-oxide interface 324. The nitride layer 314 may include a silicon nitride that may be formed using, for instance, low-pressure chemical vapor deposition, rapid thermal chemical vapor deposition, sputtering or plasma-enhanced chemical vapor deposition, or other suitable technique. In various embodiments, the nitride layer 314 may have a thickness in a range from about 20 nm to about 200 nm. The nitride layer 314 may be covered by a top layer 316. The thickness of the top layer 316 may be from about 100 nm to about 1000 nm. The top layer 316 may include a layer of borophosphosilicate glass (BPSG), which is silicon dioxide with phosphorus and boron added. In an exemplary embodiment, BPSG results from substitution of up to 15% of silicon by phosphorus and substitution of up to 15% silicon by boron.

The oxide layer 304 includes the first waveguide 306 for confining and propagating the transverse electric (TE) eigenstate and a portion of the second waveguide 308 for confining and propagating the transverse magnetic (TM) eigenstate. The first waveguide 306 includes a single crystal silicon layer. The single crystal silicon layer of the first waveguide 306 may be made of a silicon-on-insulator (SOI) material, i.e., the first waveguide 306 may be a single-crystal silicon layer separated from the single crystal silicon wafer 302 by a dielectric such as silicon oxide 304. The splitter end of the second waveguide 308 includes silicon on insulator (SOI) material 310 and a polycrystalline silicon layer 312 formed near a top face of the SOI material 310. The front end may additionally include a portion of the nitride layer 314 in various embodiments. In one embodiment, the single crystal silicon layer of the first waveguide 306 may be from about 60 nanometers (nm) to about 600 nm in width and from about 50 nm to about 300 nm in height. A bottom face of the first waveguide 306 and the second waveguide 308 may be vertically separated from the interface 322 by a distance H that is in a range from about 500 nm to about 5000 nm. Gap 220 between single crystal silicon layer of the first waveguide 306 and the SOI material 310 of the second waveguide 308 may be filled with the material of the oxide layer 304, such as silicon oxide. The width of the gap 220 (in the x-direction) may be from about 50 (nm) to about 1000 nm, in various embodiments.

In various embodiments, the polycrystalline silicon layer 312 of the second waveguide 308 may also be used as a gate of a transistor and used in particular in a subsequent FEOL step to provide alignment of the transistor during transistor fabrication. In alternate embodiments, the polycrystalline silicon layer 312 of the second waveguide 308 may be used as a component of any other suitable device formed in the CMOS layer. The polycrystalline silicon layer 312 may be deposited using low-pressure chemical vapor deposition, rapid thermal chemical vapor deposition, sputtering or plasma-enhanced chemical vapor deposition, or other suitable techniques. In various embodiments, the polycrystalline silicon layer 312 may be from about 30 nm to about 600 nm in width and from about 30 nm to about 200 nm in height. The polycrystalline silicon layer 312 may be separated from the SOI material 310 by a thin layer of oxide 309 having a thickness in a range from about 1 nm to about 10 nm.

In one embodiment, a portion of the second waveguide 308 extends above the nitride-oxide interface 324 and is covered by a portion of the nitride layer 314. In various embodiments, the polycrystalline silicon layer 312 of the second waveguide 308 extends above the nitride-oxide interface 324. Ridges 320 of silicon oxide may be formed on one or more sides of the polycrystalline silicon layer 312 that extends above the nitride-oxide interface 324. In various embodiments, the ridges 320 may have a width from about 5 nm to about 50 nm. The ridges 320 may extend above the nitride-oxide interface 324 to a height that is from about 25% to about 75% of the height of the polycrystalline silicon layer 312. The ridges 320 may be disposed between the polycrystalline silicon layer 312 and the nitride layer 314. In some embodiments, the oxide layer 309 may act as a spacer in a transistor structure.

FIG. 3 shows only the splitter cross-section 230 of the first and second waveguides. Moving along the z-axis from the splitter section towards the rotator section, the gap 220 varies as shown in FIG. 2. At the rotator cross-section 240 of the exemplary PSR shown in FIG. 3, the width of the SOI material 310 of the second waveguide 308 is increased while the width of the polycrystalline silicon layer 212 is reduced to a width from about 10 nm to about 130 nm, at which point the polycrystalline silicon layer 312 is discontinued. Thus, at the rotator cross-section 240, the first and second waveguides 206 and 208 may appear similar. The ridges 320 and the thickness of the SOI layers of the first and second waveguides 306 and 308 do not change substantially along z-axis, although the ridges 320 are discontinued when the polycrystalline layer 312 is discontinued.

Figure 4:
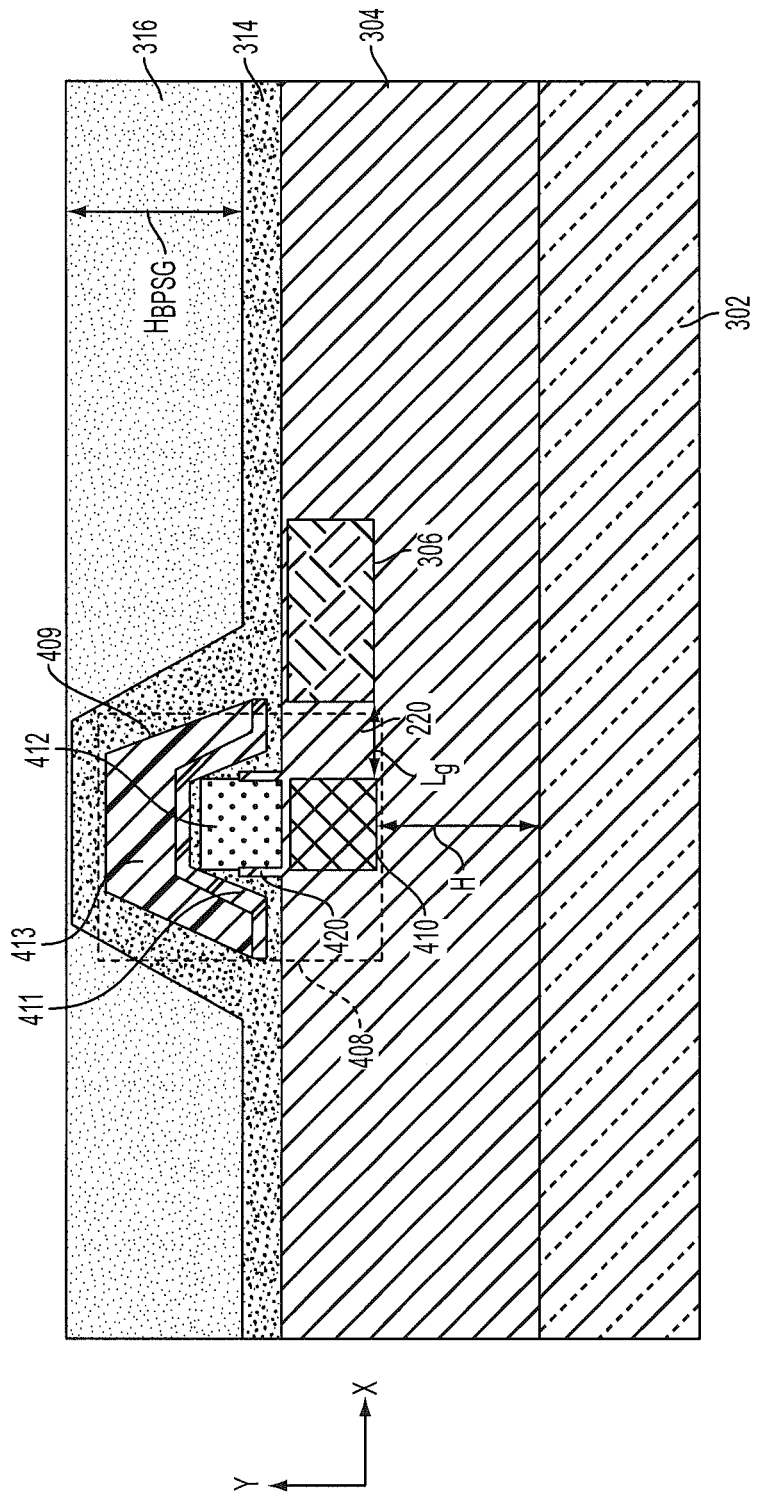
FIG. 4 shows a splitter cross-section of the CMOS layer of the wafer chip of FIG. 2 in an alternate embodiment.

FIG. 4 shows a splitter cross-sectional view 400 of the CMOS layer 200 in an alternate embodiment of the present disclosure. The alternate embodiment 400 includes a first nitride layer 314 on top of the oxide layer 304. The first nitride layer 314 may have a thickness from about 50 nm to about 300 nm. The first nitride layer 314 may form a cavity 409 in the BPSG layer 316 generally located at the second waveguide 408. In an exemplary embodiment, the cavity 409 is filled using a layer of oxide 411 and a layer of a second nitride 413. In various embodiments, the oxide layer 411 of the cavity 409 has a thickness from about 10 nm to about 100 nm and the second nitride layer 413 has a thickness from about 10 nm to about 100 nm. The splitter end of the second waveguide 408 includes silicon on insulator (SOI) material 410, a polycrystalline silicon layer 412 formed near a top face of the SOI material 410, portions of the first nitride layer 314, portions of the second nitride layer 411 and portions of the oxide layer 411. The ridges 420 may be disposed between the polycrystalline silicon layer 412 and the first nitride layer 314. Oxide layer 411 and nitride layer 413 are common in CMOS devices integrated with photonic structures and can serve in other parts of the wafer chip as encapsulation layers or etch stops. In the exemplary embodiment, the oxide layer 411 and nitride layer 413 are used to increase the photonic confinement in the second waveguide 408.

The waveguides 406 and 408 of FIG. 4 vary along the z-axis as shown in FIG. 2. Similarly, the gap 220 varies along the z-axis as shown in FIG. 2. In the rotator cross-section 240, the width of the second waveguide 408 is similar to the width of second waveguide 208 of FIG. 2. At the rotator cross-section 240, the width of the SOI layer 410 is increased while the width of the polycrystalline layer 412 is reduced to a width from about 10 nm to about 130 nm, at which point the polycrystalline layer 412 may be discontinued. As the width of the polycrystalline layer 412 is reduced, the width of the cavity 409 may be correspondingly reduced. The cavity 409 with oxide layer 411 and second nitride layer 413 may be discontinued once the polycrystalline layer 412 is discontinued. The ridges 420 and the thickness of the layers do not change substantially along z-axis although the ridges 420 may be discontinued when the polycrystalline layer 412 is discontinued.

Figure 5:
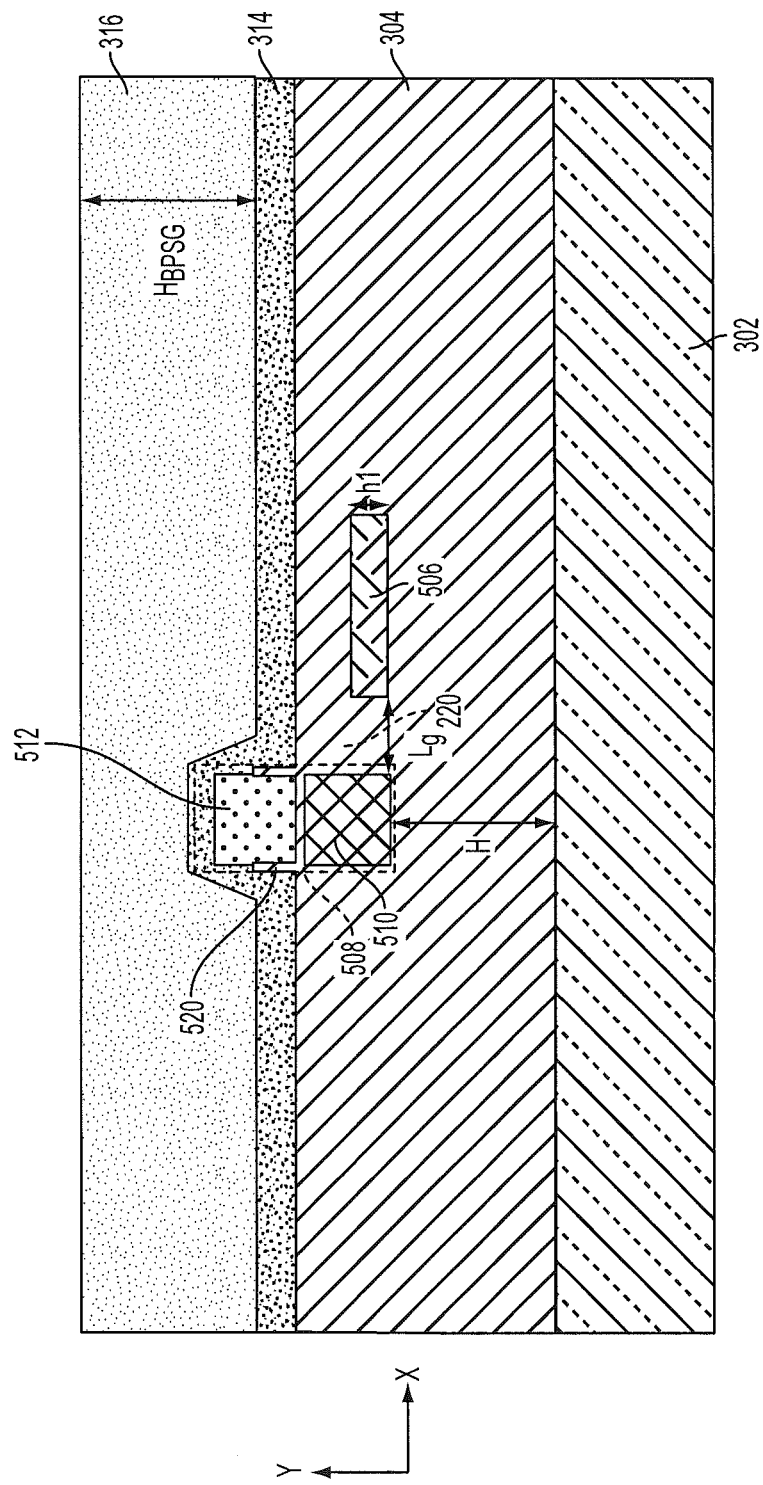
FIG. 5 shows a splitter cross-section of the CMOS layer of the wafer chip of FIG. 2 in another alternate embodiment.

FIG. 5 shows a splitter cross-sectional view of the CMOS layer 200 in an alternate embodiment. In the alternate embodiment, height ($h_1$) of the first waveguide 506 is less than height ($h_2$) of the single-crystal silicon layer 510 of the second waveguide 508. In an exemplary embodiment, the height $h_1$ of the first waveguide is no more than 60% of the height $h_2$ of the SOI layer 510 of the second waveguide 508. The reduction in height of waveguide 506 is used in situations where the light confinement in the waveguides is unbalanced. Reducing the height of 506 enhances the transfer of the TM eigenstate to waveguide 508 across gap 220.

The waveguides 506 and 508 of FIG. 5 vary along the z-axis as shown in FIG. 2. The gap 220 varies along the z-axis as shown in FIG. 2. At the splitter cross-section 240, the width of the second waveguide 508 is similar to the width of the second waveguide 208 in FIG. 2. At the rotator cross-section 240, the width of the single-crystal silicon layer 510 is increased while the width of the polycrystalline layer 512 is reduced to a width of from about 10 nm to about 130 nm at which point the polycrystalline layer 512 may be discontinued. At the rotator cross-section 240, the height $h_2$ of the single-crystal silicon layer 510 may be reduced to the height $h_1$ of the first waveguide 506. Changes in height may be achieved by using two different lithographic layers at fabrication. Hence, the height of the single-crystal silicon layer 510 may be transformed by reducing the width of the top section of the single-crystal silicon layer 510. The height of the single-crystal silicon layer 510 may be gradually reduced concurrently with the reduction in the width of the polycrystalline layer 512 or after the polycrystalline layer 512 is discontinued. The ridges 520 and the thickness of the layers do not change substantially along the z-axis, although the ridges 520 may be discontinued when the polycrystalline layer 512 is discontinued.

Figure 6:
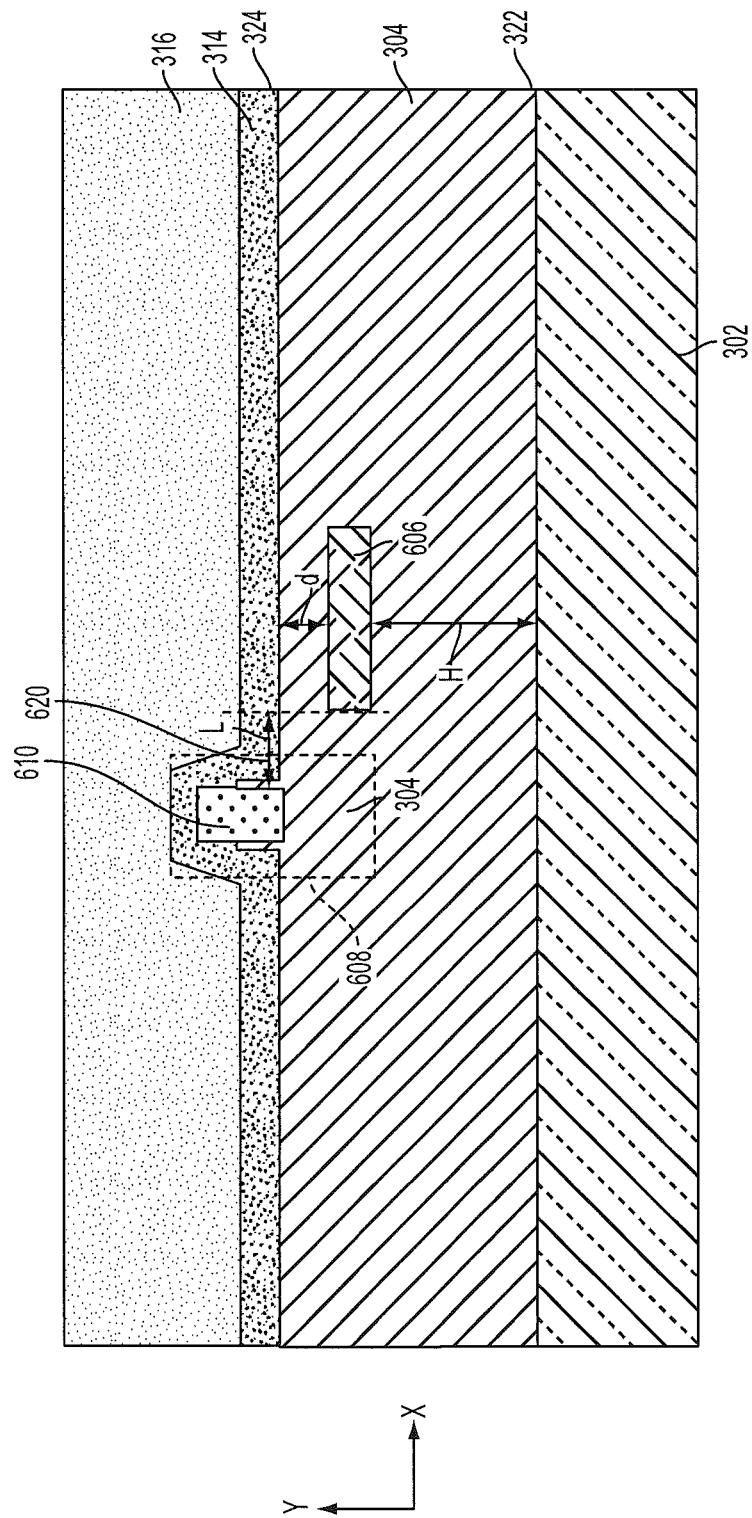
FIG. 6 shows a splitter cross-section of the CMOS layer of the wafer chip of FIG. 2 in yet another alternate embodiment.

FIG. 6 shows a splitter cross-sectional view of the CMOS layer 200 of FIG. 2 in another alternate embodiment. The bottom face of the first waveguide 606 may be separated from the interface 322 by a distance H in a range from about 500 nm to about 5000 nm. The top face of the first waveguide 606 may be separated from the oxide-nitride interface 324 by a distance from about 1 nm to about 200 nm. In another embodiment, the top face of the first waveguide 606 may be separated from the oxide nitride interface 324 by a distance from about 20 nm to about 150 nm. The width of the first waveguide 606 may be from about 100 nm to about 1000 nm and the height of the first waveguide 606 may be from about 20 nm to about 150 nm. The second waveguide 608 at the splitter end includes a polycrystalline silicon layer 610. The polycrystalline silicon layer 610 is disposed with its bottom face aligned with the oxide-nitride interface 324. Distance L 620 corresponds to gap 220 at the splitter cross-section 230 shown in FIG. 2. No layer of single-crystal silicon material is present at the input end of the second waveguide 608. Instead, the second waveguide 608 may include (from bottom to top) an oxide layer 304, a polycrystalline silicon layer 610 and a nitride layer 314. The TE eigenstate is confined to and propagates within the first waveguide 606 and the TM eigenstate is confined and propagates within the polycrystalline silicon layer 610 and the portion of the nitride layer 314 within the second waveguide 608. The nitride layer 314 may have a height from about 20 nm to about 200 nm.

Figure 7:
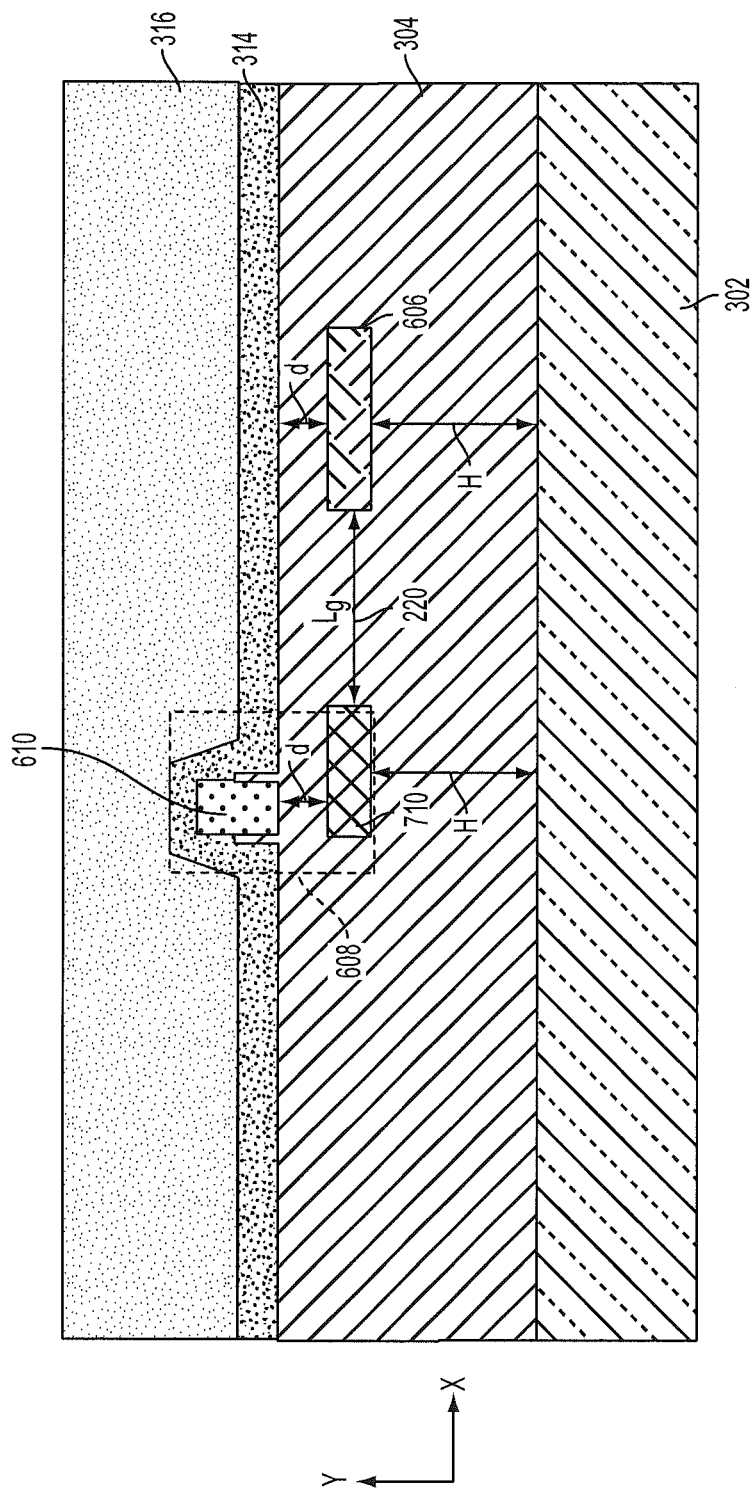
FIG. 7 shows a rotator cross-section of the CMOS layer of the wafer chip of FIG. 2 that corresponds to the splitter cross-section of FIG. 6.

FIG. 7 shows a rotator cross-sectional view 240 of the CMOS layer 200 related to the splitter cross-section view 230 shown in FIG. 6. At the rotator cross-section 240, the first waveguide 606 has migrated away from its position at the splitter cross-section 230 with respect to the second waveguide 608. Also, an SOI layer 710 of the second waveguide 608 has appeared. As the light travels along the axis of the second waveguide 608, the width of polycrystalline layer 610 is gradually reduced to a width in a range from about 10 nm to about 130 nm, at which point the polycrystalline layer 610 may be discontinued. Additionally, SOI layer 710 appears gradually and as the light travels along the axis of the second waveguide 608. Through this gradual appearance of the SOI layer 710 and gradual disappearance of polycrystalline layer 610, the TM eigenstate is transferred from the polycrystalline layer 610 to the SOI layer 610, thereby rotating the TM eigenstate of the polycrystalline layer 610 to a TE eigenstate in the SOI layer 710. At the exemplary rotator cross-section of FIG. 7, the first waveguide 606 is separated from the second waveguide 616 by a separation gap 220 having a length $L_g$ that is at least 500 nm ($L_g \geq 500$ nm). The separation gap 220 is wide enough to prevent cross-talk between the first waveguide 606 and the second waveguide 710.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of managing a polarization of an optical signal on a wafer chip, comprising:
   providing a first waveguide and a second waveguide in a front-end of the line layer of the wafer chip, wherein a splitter end of the second waveguide includes a splitter end and a rotator end, wherein the splitter end includes a layer of polycrystalline silicon, a layer of silicon oxide and a layer of silicon nitride and the rotator end includes a layer of single crystal silicon, a layer of silicon oxide and a layer of silicon nitride;
   receiving the optical signal at an input end of the first waveguide;
   propagating a transverse electric eigenstate of the received optical signal in the first waveguide; and
   propagating a transverse magnetic eigenstate in the second waveguide via the plurality of layers to manage the polarization of the transverse magnetic eigenstate.

2. The method of claim 1, further comprising propagating the transverse electric eigenstate at the rotator end of at least one of the first waveguide and the second waveguide formed in a material layer shared with a transistor fabricated into the wafer chip.

3. The method of claim 1, wherein the splitter end of the second waveguide further includes a cavity in the nitride layer that encloses an additional nitride layer and a silicon oxide layer.

4. The method of claim 1, wherein the second waveguide further includes a silicon oxide layer at the splitter end, further comprising propagating the transverse magnetic eigenstate in a silicon oxide layer at a splitter end of the first waveguide having a height that is less than about 60% of a height of the silicon oxide layer at the splitter end of the second waveguide.

* * * * *